United States Patent
Katsumata et al.

(10) Patent No.: US 6,237,886 B1
(45) Date of Patent: May 29, 2001

(54) ATTACHMENT MECHANISM FOR A VEHICLE LIGHT

(75) Inventors: Shinichi Katsumata; Masaki Konaka, both of Utsunomiya (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/419,079

(22) Filed: Oct. 15, 1999

(30) Foreign Application Priority Data

Oct. 15, 1998 (JP) ................................................. 10-293883

(51) Int. Cl.$^7$ ............................ F21V 21/30; B60Q 1/068
(52) U.S. Cl. ................ 248/225.21; 248/222.12; 362/368; 362/370
(58) Field of Search ................ 248/225.21, 222.12, 248/229.26, 447, 450, 454, 538, 539, 125.1, 185.1, 460, 161; 362/549, 368, 370

(56) References Cited

U.S. PATENT DOCUMENTS

| | | | |
|---|---|---|---|
| 5,089,939 | * | 2/1992 | Baader ................................... 362/61 |
| 5,197,789 | * | 3/1993 | Lin ..................................... 312/223.2 |
| 5,424,923 | * | 6/1995 | Young et al. ............................ 362/66 |
| 5,428,511 | * | 6/1995 | Luallin et al. ........................... 362/66 |
| 5,487,677 | * | 1/1996 | Hoffner ................................ 439/293 |
| 5,924,790 | * | 7/1999 | Ponton et al. ........................ 362/370 |
| 5,961,205 | * | 10/1999 | Lovell ................................. 362/306 |
| 6,024,426 | * | 2/2000 | Korinsky et al. .................. 312/223.2 |
| 6,050,854 | * | 4/2000 | Fang et al. ........................... 439/607 |

FOREIGN PATENT DOCUMENTS

| | | |
|---|---|---|
| 0 026 402 B1 | 1/1984 | (EP) . |
| 2 088 543A | 6/1982 | (GB) . |
| 63-160606 | 10/1988 | (JP) . |

* cited by examiner

Primary Examiner—Leslie A. Braun
Assistant Examiner—Steve Marsh
(74) Attorney, Agent, or Firm—Morgan, Lewis & Bockius LLP

(57) ABSTRACT

A vehicle light attachment mechanism is disclosed for attaching a vehicle light to a vehicle body. The attachment mechanism includes a pair of hooks arranged on the vehicle light, one of which is elastic and the other of which is non-elastic. Each hook can engage an aperture of the vehicle body in opposing directions. A positioning boss can be placed adjacent either the elastic hook or the non-elastic hook for extending through a positioning through hole on the vehicle body having a diameter corresponding to the diameter of the positioning boss. Furthermore, at least one projection boss may be provided to distance the housing and the vehicle body and spread external forces applied from the vehicle light toward the vehicle body over an outer surface of the vehicle body. At least one projection boss can also be used as a positioning boss to provide at least two positioning points in combination with said positioning boss for the housing. Since the attachment mechanism does not include any metal attachment parts, such as a stud bolt, the vehicle light can be easily recycled and the components of the light can be easily sorted when the vehicle light is disposed of and destroyed.

12 Claims, 3 Drawing Sheets

ATTACHMENT MECHANISM FOR A VEHICLE LIGHT

This invention claims the benefit of Japanese Patent Application No. 10-293883, filed on Oct. 15, 1998, which is hereby incorporated by reference.

BACKGROUND OF THE INVENTION

1. Field of the Invention

The invention relates to an attachment mechanism for a vehicle part to a vehicle, such as for a vehicle light to a vehicle body. More particularly, the invention relates to an attachment mechanism that is made up of components that can be easily sorted that disposal and recycling of the mechanism is facilitated at the end of its useful life. Also, the attachment mechanism is capable of providing secure attachment of the vehicle light to the vehicle body.

2. Discussion of the Related Art

FIG. 4 illustrates a conventional attachment mechanism 90 for a vehicle light 10 to a vehicle body 20. The attachment mechanism 90 includes a housing 11 for a vehicle light 10. The housing 11 is made up of the following components: a rib 12 along the perimeter of outer back portion of housing 11; three stud bolts 91 positioned inside the rib 12; three through holes positioned inside the stud bolts 91 for attachment of a light bulb to the housing 11; and a gasket 13 interposed between the housing 11 and the vehicle body 20. The vehicle body 20 and housing 11 include three through holes 92 corresponding to the stud bolts 91 and three nuts 93 which correspond to the stud bolts 91 and are attached from inside of the vehicle body 20. Each stud bolt 91 is inserted and fixed in the housing 11 by insertion molding or by a pressing process using ultrasonic waves. Each stud bolt 91 is inserted from outside of the vehicle body 20, through a predetermined through hole on a gasket 13, to the predetermined through hole 92 in the vehicle body 20. The stud bolts 91 is fixed by a nut 93 from inside of the vehicle body 20 which presses the gasket 13 onto 12 of housing 11.

FIG. 5 illustrates another conventional attachment mechanism for a vehicle light 10 to a vehicle body 20. The vehicle light 10 includes a housing 11 having an aperture for the purpose of changing a light bulb in the housing 11. A pair of elastic hooks 94 project from the outer back surface of the housing 11 and are made of plastic resin—which is the same material as comprises housing 11. The vehicle light 10 is attached to the vehicle body 20 by being pushed from outside of the vehicle body 20 into an aperture 95 in the vehicle body 20. When the vehicle light 10 is pushed in, the elastic hook 94 curves and returns to its original position by its elasticity. Thus, the elastic hook 94 latches onto the attachment portion of vehicle body 20.

The conventional attachment mechanisms for attaching a vehicle light to a vehicle body have the following problems. The attachment mechanism 90 in FIG. 4 is able to provide a secured attachment by using a stud bolt 91. However, the stud bolt 91 is usually metal that is strongly adhered to surrounding portions of the housing, which are made of resin. Accordingly, when the vehicle light 10 is disposed of and destroyed, it is difficult to deconstruct and sort each of the vehicle light's components for recycling without damaging the resin plastic material. In addition, the various materials required to construct the attachment mechanism increase the cost of manufacture and sale of the mechanism.

The attachment mechanism shown in FIG. 5 does not have the same sorting problem during recycling of the device as does the mechanism of FIG. 4. However, since the hook 94 is elastic and designed to curve in a Z direction parallel to the vehicle body 20, and is oriented in a direction of engagement between the elastic hook 94 and the vehicle body 20, the attachment mechanism has relatively low shock-proof reliability when an external force is applied in the Z direction. For example, if a concentration of force is applied in the Z direction and one of the pair of elastic hooks 94 flexes, the other elastic hook 94 easily detaches from the aperture, and the vehicle light 10 may detach from the vehicle body 20.

SUMMARY OF THE INVENTION

The invention is directed to an attachment mechanism that substantially obviates one or more of the above problems due to the limitations and disadvantages of the related art.

An object of the invention is to provide an attachment mechanism for a vehicle light to a vehicle body which is able to resist detachment due to force applied in a direction of engagement of the attachment portions. Another object is to provide an attachment mechanism that is economically manufactured and easily recycled when the vehicle light is disposed of and destroyed.

The above and other objects are achieved by providing a vehicle light attachment mechanism for attaching a vehicle light to a vehicle body that includes a main aperture and at least one positioning through hole, the attachment mechanism including a housing, a substantially non-elastic hook extending from said housing and configured to engage the vehicle body in a first direction, a substantially elastic hook extending from said housing and configured to engage the vehicle body in a second direction opposite said first direction, and at least one positioning boss adjacent said substantially elastic hook and configured to extend through the positioning through hole and into the vehicle body.

In accordance with another aspect of the invention a vehicle light attachment mechanism for attaching a vehicle light to a vehicle body having a main aperture includes a housing, a substantially non-elastic hook extending from said housing and configured to engage the vehicle body, a substantially elastic hook extending from said housing and configured to engage the vehicle body, and positioning means located adjacent one of said substantially elastic hook and said substantially non-elastic hooks for preventing movement of said housing with respect to the vehicle body.

Furthermore, at least one projection boss may be arranged to provide a sufficient distance between the housing and the vehicle body for spreading any external forces applied from the vehicle light toward the vehicle body over an outer surface of the vehicle body. At least one projection boss can also be used as a positioning boss. Accordingly, the housing can have two positioning points.

Additional objects and advantages of the invention will be set forth in part in the description which follows, and in part will be obvious from the description, or may be learned by practice of the invention. The objects and advantages of the invention can be realized and attained by the elements and combinations particularly pointed out in the appended claims.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENTS

Reference will now be made in detail to the preferred embodiments of the invention. Whenever possible, the same reference numbers will be used throughout the drawings to refer to the same or like parts.

Figure 1:
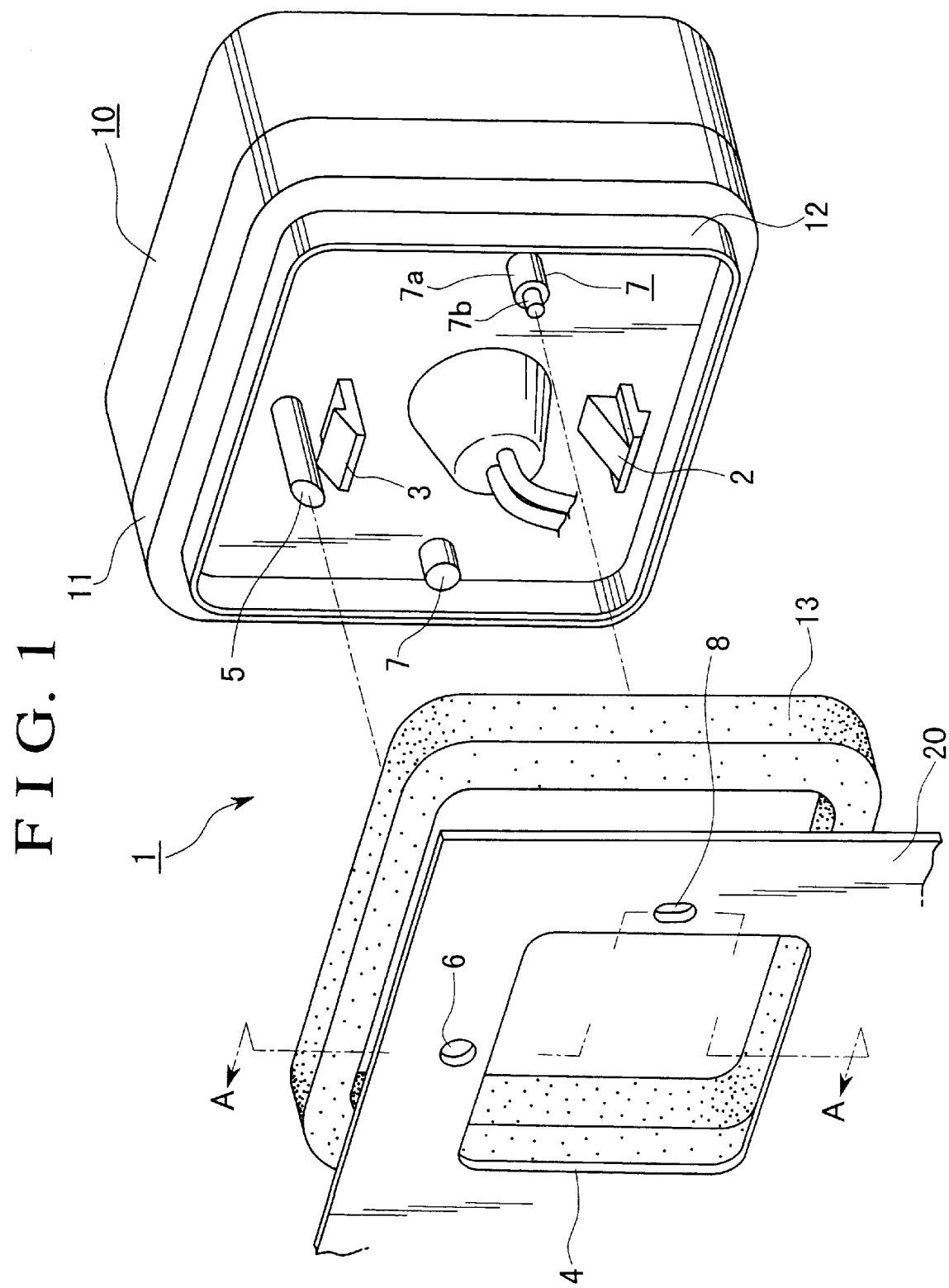
FIG. 1 illustrates a perspective exploded view of a preferred embodiment of an attachment mechanism made in accordance with the principles of the invention.
Figure 2:
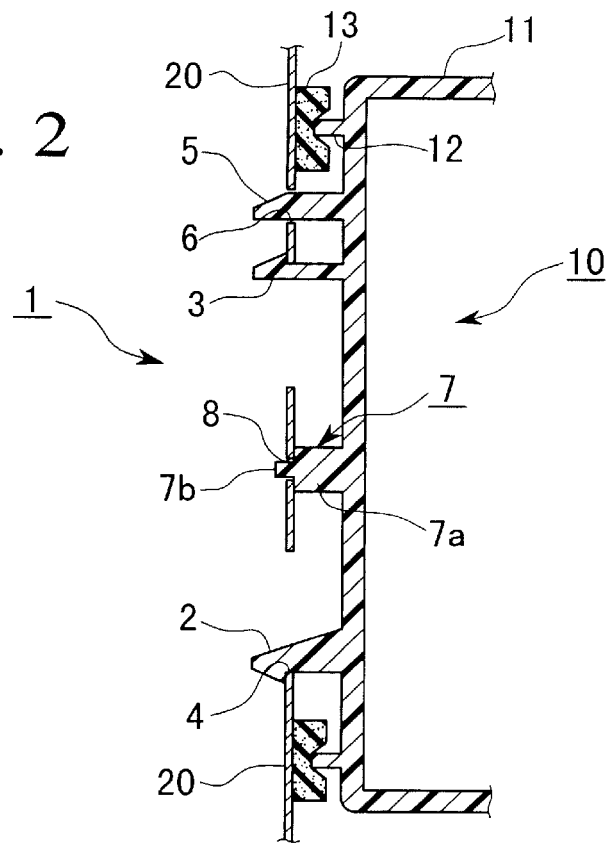
FIG. 2 illustrates a cross-sectional unexploded view taken along line A—A of FIG. 1.

FIGS. 1 and 2 illustrate a preferred embodiment of the invention. FIG. 1 is an exploded view, and FIG. 2 is an unexploded cross sectional view taken along line A—A of FIG. 1. The attachment mechanism 1 for attaching the vehicle light 10 to the vehicle body 20 includes a pair of hooks 2 and 3 which can oppose each other on either side of a light bulb socket and can be made of resin material. The hooks 2 and 3 can be molded at the same time and as a single unit with housing 11. Hook 2 is substantially non-elastic because it is molded with a reinforcement rib facing the center of the housing. Hook 3 is designed to be relatively elastic and has a predetermined thickness. Hooks 2 and 3 can be positioned around an aperture 4 in the vehicle body 20 when the vehicle light 10 is attached to the vehicle body 20. The aperture 4 of the vehicle body 20 may be used solely for attachment of the vehicle light, or may be used both for the attachment of the vehicle light and for changing the light bulb in the housing 10. A positioning boss 5 can be arranged in the vicinity of an engaging side of the elastic hook 3, and has sufficient length to extend through a first positioning through hole 6 in the vehicle body 20 when the vehicle light 10 is attached to the vehicle body 20. The first positioning through hole 6 has a diameter corresponding to the diameter of the positioning boss 5.

A pair of projection bosses 7 are configured to support the vehicle light 10 and prevent the vehicle light 10 from being deformed or moved toward the vehicle body 20 when external force is applied to the light 10. The first projection boss 7 has a length that is sufficient to reach a surface of the vehicle body 20. The second projection boss 7 includes a base portion 7a and a projection end 7b. The projection end 7b has a smaller diameter than the base portion 7a and corresponds to a second positioning through hole 8 on the vehicle body 20. When the vehicle light 10 is attached to the vehicle body 20, the projection end 7b can be inserted in the second positioning through hole 8. In addition, the base portion 7a can be positioned to rest on the lip of the second positioning through hole 8 without extending into the through hole 8.

Figure 3:
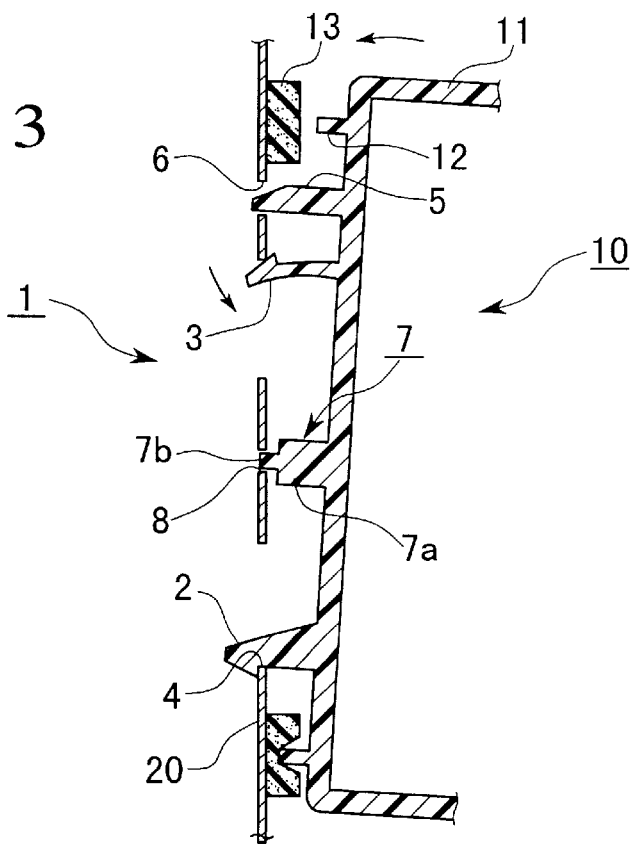
FIG. 3 illustrates a cross-sectional unexploded view showing the attachment process for the mechanism shown in FIG. 1.
Figure 4:
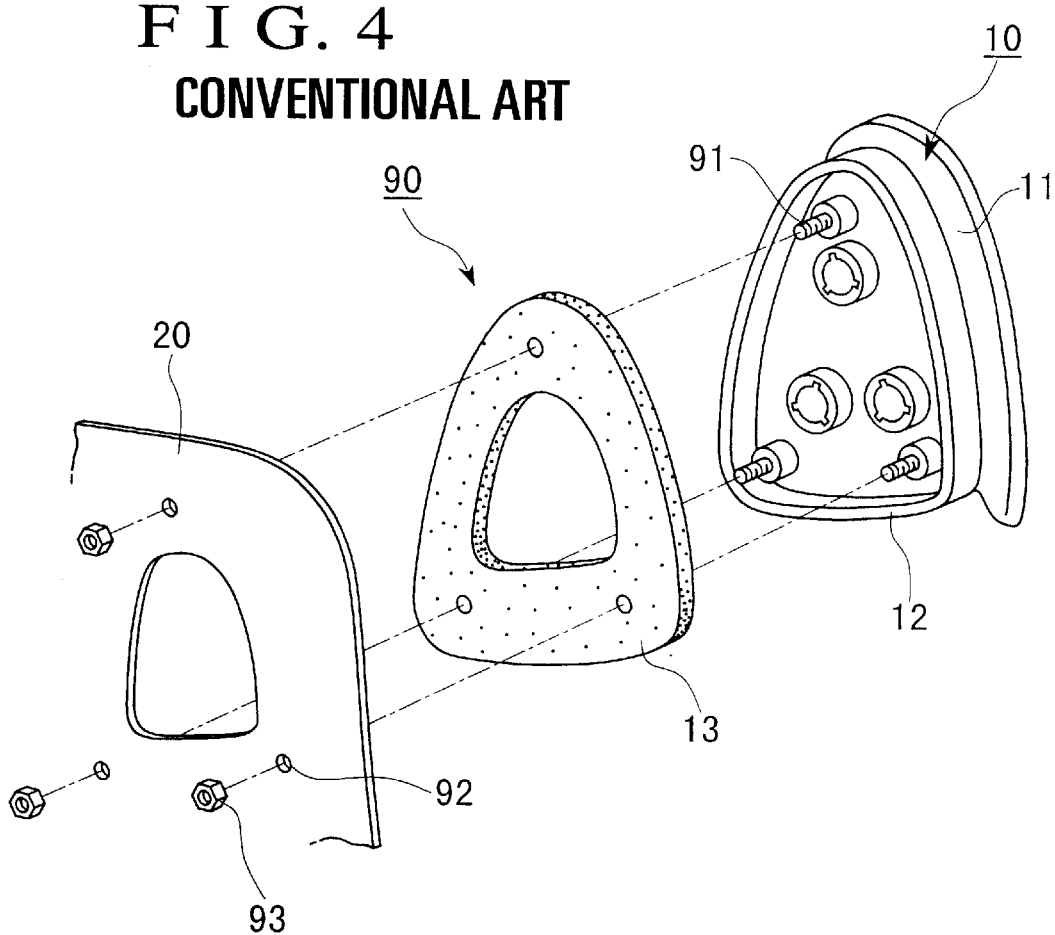
FIG. 4 illustrates a perspective view of a conventional attachment mechanism for attaching a vehicle light to the vehicle body.
Figure 5:
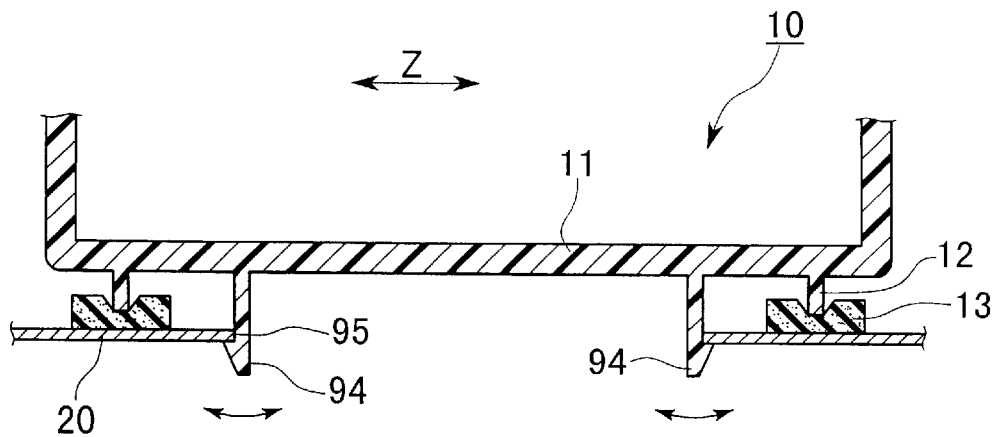
FIG. 5 illustrates a cross sectional view of another conventional attachment mechanism for attaching a vehicle light to the vehicle body.

FIG. 3 illustrates a process for attaching a vehicle light 10 to a vehicle body 20 by the attachment mechanism 1. First, hook 2 is hung in its predetermined position around the aperture 4. Second, the vehicle light 10 is rotated about the non-elastic hook 2, and pushed toward the vehicle body 20. Hook 3 is then pressed and attached in its predetermined position in the aperture 4, while the positioning boss 5 is inserted into the first positioning through hole 6 and the projection end 7b is inserted into the second positioning through hole 8. A projection end of the positioning boss 5 may be cut and shaped (in cross section) as an arc to correspond with the rotational movement for insertion of the positioning boss 5 into the first positioning through hole 6. The second positioning through hole 8 may be formed as a rectangle or oval or combination thereof. For example, the second positioning through hole 8 can appear to be a slot with circular ends.

Since the positioning boss 5 is inserted in the positioning through hole 6 at the same time as the elastic hook 3 is pressed in the vehicle body 20, the vehicle light 10 is prevented from being moved in a direction parallel to the vehicle body 20 when an external force is applied to the vehicle light 10 in such a direction. In addition, the configuration of the position boss 5 and elastic hook 3 prevents external forces from being applied to and/or bending the elastic hook 3. Therefore, the risk of accidental detachment of the vehicle light 10 from the vehicle body 20 is greatly reduced. However, when any excessively strong force is applied to the positioning boss 5, the vehicle light 10 may rotate about the positioning boss 5. The projection end 7b and the second positioning through hole 8 are provided to prevent such rotation. The two portions that comprise the positioning boss 5 and the projection end 7b are inserted in the vehicle body 20. Thus, the projection end 7 effectively spreads the external force in a direction that tends to push the vehicle light 10 to the vehicle body 20 at least at the portion of the surface of the vehicle body 20 that contacts the projection end 7.

The housing 11 has a water-proof rib 12 along a perimeter of its outer back surface for protecting the aperture 4 from entry of water drops or humidity. When the vehicle light 10 is attached to the vehicle body 20, the water-proof rib 12 can be pressed onto the vehicle body 20 via an intervening gasket 13. The height of the rib 12 can be determined by the thickness of the gasket 13.

The operational advantages of the vehicle light attachment mechanism 1 according to the preferred embodiment of the invention will now be described.

The attachment mechanism 1 is able to provide a secure attachment between the vehicle light 10 to the vehicle body 20 and can be made solely from plastic resin, which is a common and easily recyclable material. In addition, since the attachment mechanism 1 does not include any metal attachment structures, such as a stud bolt, sorting of the vehicle light components by different materials is not required when the vehicle light is disposed of and destroyed for recycling. This second advantage is especially effective to satisfy environmental requirements which are becoming more important.

It will be apparent to those skilled in the art that various changes and modifications can be made herein without departing from the spirit and scope of the invention. Thus, it is intended that the invention cover the modifications and variations of this invention provided they come within the scope of the appended claims and their equivalents.

What is claimed is:

1. A vehicle light attachment mechanism for attaching a vehicle light to a vehicle body that includes a main aperture and at least one positioning through hole, the attachment mechanism comprising:

a housing;

a substantially non-elastic hook extending from said housing and configured to engage the vehicle body in a first direction;

a substantially elastic hook extending from said housing and configured to engage the vehicle body in a second direction opposite said first direction, and at least one positioning boss adjacent said substantially elastic hook and configured to extend through the positioning through hole and into the vehicle body, wherein said substantially non-elastic hook can be inserted into the vehicle body and said housing can be pivoted about said substantially non-elastic hook until said positioning boss is inserted into the positioning through hole and while said substantially elastic hook simultaneously engages the vehicle body, to prevent the housing from being moved in a direction parallel to said vehicle body.

2. The vehicle light attachment mechanism according to claim 1, further comprising:

at least one projection boss located on the housing and configured to distance the housing from the vehicle body and spread external forces that are applied from the vehicle light toward the vehicle body over an outer surface of the vehicle body.

3. The vehicle light attachment mechanism according to claim 2, wherein said at least one projection boss is configured to be used as a positioning boss.

4. The vehicle light attachment mechanism according to claim 1, wherein said substantially non-elastic hook has a rib located on a side of said substantially non-elastic hook that generally faces towards said substantially elastic hook.

5. The vehicle light attachment mechanism according to claim 1, wherein said substantially non-elastic hook, said substantially elastic hook, and said housing are formed as one unit by resin molding.

6. A vehicle light attachment mechanism for attaching a vehicle light to a vehicle body that includes a main aperture, the attachment mechanism comprising:

a housing;

a substantially non-elastic hook extending from said housing and configured to engage the vehicle body;

a substantially elastic hook extending from said housing and configured to engage the vehicle body, and positioning means located adjacent one of said substantially elastic hook and said substantially non-elastic hook for positionally guiding said housing onto said vehicle body and for preventing flexion of said substantially elastic hook and movement of said housing in a transverse direction with respect to the vehicle body.

7. The vehicle light attachment mechanism according to claim 6, further comprising:

projection means located on the housing for distancing the housing from the vehicle body and spreading external forces that are applied from the vehicle light toward the vehicle body over an outer surface of the vehicle body.

8. The vehicle light attachment mechanism according to claim 7, wherein said projection means includes means for positioning said housing with respect to the vehicle body.

9. The vehicle light attachment mechanism according to claim 6, wherein said substantially non-elastic hook has a rib located on a side of said substantially non-elastic hook that generally faces said substantially elastic hook.

10. The vehicle light attachment mechanism according to claim 6, wherein said substantially non-elastic hook, said substantially elastic hook, and said housing are formed as one unit by resin molding.

11. The vehicle light attachment mechanism according to claim 6, wherein said substantially non-elastic hook and said substantially elastic hook each include hook portions that face away from each other such that they can interact with and snap into an aperture in the vehicle body to secure the housing to the vehicle body.

12. The vehicle light attachment mechanism according to claim 6, wherein said positioning means is located adjacent said elastic hook.

* * * * *